Patented Oct. 4, 1938

2,132,190

UNITED STATES PATENT OFFICE 2,132,190

VAT DYESTUFF

Georg Rösch, Cologne-Muhlheim, Germany, Paul Nawiasky, Summit, N. J., and Karl Saftien, Ludwigshafen-on-the-Rhine, Germany, assignors to General Aniline Works, Inc., New York, N. Y., a corporation of Delaware No Drawing. Application November 20, 1936, Serial No. 111,844. In Germany November 21, 1935

6 Claims. (Cl. 260—312)

The present invention relates to vat dyestuffs of the pyrazoloanthraquinone series.

We have found that valuable vat dyestuffs are obtained by causing the hitherto unknown carboxylic acids of 1(N).2-pyrazoloanthraquinones of the general constitution:—

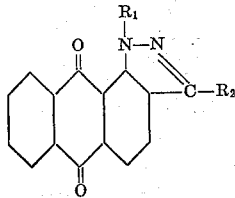

in which $R_1$ stands for hydrogen or an alkyl or aryl group and $R_2$ for a carboxyl group attached directly or by an aryl nucleus to the Py-carbon atom or their halogen-containing derivatives, preferably in the form of their chlorides, to react with aromatic amino compounds containing at least one cyclic bound keto group. The compounds thus obtainable are carboxylic acid amides. When the amino compounds employed contain in ortho-position to the amino groups a hydroxyl, mercapto or further amino group, there may be obtained carboxylic acid amides or, by the splitting off of water, the corresponding azoles.

When the amine used contains two or more amino groups which are not in ortho-position, the radicle of the carboxylic acid may be introduced into the molecule a corresponding number of times. On the other hand, only a part of the amino groups may be caused to react with the pyrazole carboxylic acids, the remaining free amino groups having other kinds of acyl groups introduced into them.

The 1(N).2-pyrazoloanthraquinone-PyC-carboxylic acid:—

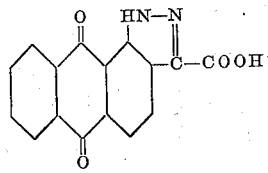

suitable for example as an initial material according to this invention may be prepared for example by treating 1-chlor-2-acetylanthraquinone with hydrazine hydrate and oxidizing the PyC-methyl-1(N).2-pyrazoloanthraquinone thus obtained with pyrolusite in sulphuric acid solution.

Those pyrazole carboxylic acids as contain an aryl nucleus between the carbon atom standing in the 2-position and the carboxylic group may also be prepared by causing 1-halogen-anthraquinone-2-ketocarboxylic acids of the general composition:—

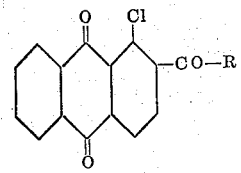

wherein R stands for a carboxylic group attached directly or by an aryl nucleus to the CO-group, to react with hydrazine or primary alkyl or aryl hydrazines. The compounds having the above structural formula may be prepared, for example, by condensing a 1-halogenanthraquinone-2-carboxylic acid halide with an aromatic hydrocarbon having at least one side-chain, in the presence of anhydrous aluminum chloride and oxidation of the resulting compound with pyrolusite in the presence of sulphuric acid.

The said ketocarboxylic acid may also first be converted into the corresponding amino compound with ammonia, the said compound diazotized in sulphuric acid solution and the diazonium salt converted into the corresponding 1(N).2-pyrazoloanthraquinone carboxylic acid by means of sodium bisulphite solution while heating.

Alkylated derivatives of the pyrazoloanthraquinone carboxylic acids may also be obtained by alkylating the carboxylic acids in known manner. In this case the alkyl groups enter different positions in the pyrazole ring depending on the reaction conditions. When the carboxylic groups are thereby simultaneously esterified, the resulting compounds must be saponified again. For the preparation of such alkylated derivatives, the dyestuffs may also be treated with alkylating agents.

The reaction of the acid chlorides with the aromatic amino compounds is preferably carried out in the presence of organic diluents such as nitrobenzene or trichlorbenzene.

The new dyestuffs are generally speaking distinguished by very good properties as regards fastness.

The following examples serve to further illustrate our said invention but we do not wish to be limited thereto. The parts are by weight.

*Example 1*

A mixture of 7.8 parts of the chloride of 1(N).2-pyrazoloanthraquinone-PyC-carboxylic acid (obtainable for example by the oxidation of PyC-methyl-1(N).2-pyrazoloanthraquinone, which is obtainable by causing hydrazine to act on 1-chlor-2-acetylanthraquinone, with pyrolusite in sulphuric acid solution and treatment of the carboxylic acid thus obtained with thionyl chloride in nitrobenzene), 6 parts of 1-aminoanthraquinone and 300 parts of nitrobenzene is heated for four hours at 160° C. After cooling to 120° C., the dyestuff formed is filtered off by suction and washed with a little cold nitrobenzene. It dyes cotton powerful greenish yellow shades from a red-brown vat and has the following formula:—

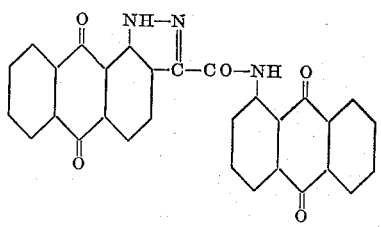

*Example 2*

A mixture of 6.2 parts of the chloride used in Example 1, 7.5 parts of 1-amino-5-benzoylaminoanthraquinone and 280 parts of nitrobenzene is heated for 3 hours at 160° C. The dyestuff is then filtered off by suction at 120° C. and washed with a little nitrobenzene. It dyes cotton powerful yellow shades from a red-brown vat and has the following formula:—

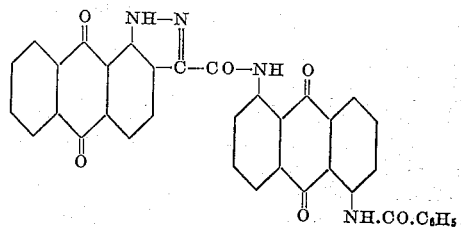

Similar dyestuffs are obtained by employing 1-amino-5-(para-methylbenzoyl)-aminoanthraquinone, 1-amino-5-(para-chlorbenzoyl)-aminoquinone or 1-amino-5-(2'.5'-dichlorbenzoyl)-aminoanthraquinone instead of 1-amino-5-benzoylaminoanthraquinone.

*Example 3*

A mixture of 3.1 parts of the chloride used in Example 1, 1.2 parts of 1.5-diaminoanthraquinone and 85 parts of nitrobenzene is heated for some hours at 160° C. The dyestuff is then filtered off by suction at 120° C. It dyes cotton powerful yellow shades from a red-brown vat and has the following formula:—

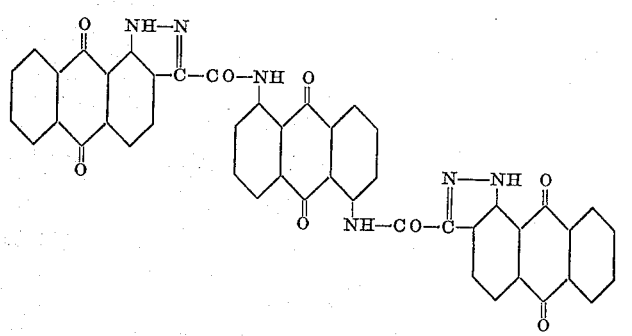

*Example 4*

A mixture of 31 parts of the chloride used in Example 1, 25 parts of 4-amino-1.9-anthrapyrimidine and 1000 parts of nitrobenzene is heated for four hours at 160° C. The dyestuff is then filtered off by suction at 120° C. and washed. It dyes cotton brilliant yellow shades from a yellow-red vat and has the following formula:—

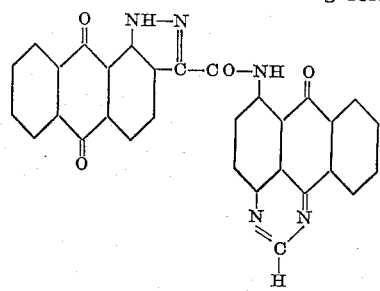

By using 5-amino-1.9-anthrapyrimidine, a compound is obtained which yields reddish yellow dyeings.

*Example 5*

A mixture of 31 parts of the chloride used in Example 1, 25 parts of 2-amino-3-hydroxyanthraquinone and 1000 parts of nitrobenzene is heated for an hour at 160° C. The resulting compound is filtered off by suction at 120° C. and heated at the said temperature for an hour with 1800 parts of concentrated sulphuric acid. By adding 300 parts of water, the dyestuff is precipitated as the sulphate which is filtered off by suction while cold and decomposed by boiling with water. The dyestuff dyes cotton brilliant yellow shades from a brown vat and has the following formula:—

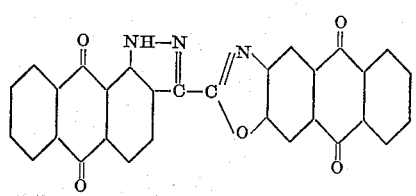

Example 6

A mixture of 4.5 parts of the chloride of a methylated 1(N).2-pyrazoloanthraquinone-PyC-carboxylic acid (prepared for example by methylating the 1(N).2-pyrazoloanthraquinone-PyC-carboxylic acid obtained as described in Example 1 with para-toluene sulphonic acid methyl ester in trichlorbenzene in the presence of potash, saponification of the resulting ester by heating with 80 per cent sulphuric acid at 120° C. and treatment of the methylated acid with thionyl chloride in the presence of nitrobenzene), 3.3 parts of 1-aminoanthraquinone and 180 parts of nitrobenzene is heated for 3 hours at 160° C. The dyestuff thus obtained is filtered off by suction at 160° C. It dyes cotton powerful yellow shades from a red vat and has the following formula:—

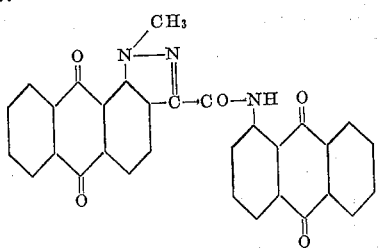

If 1-amino-5-benzoylaminoanthraquinone be used instead of 1-aminoanthraquinone, a similar dyestuff is obtained.

Example 7

A mixture of 38.7 parts of the chloride of PyC-phenyl-1(N).2-pyrazoloanthraquinone-4'-carboxylic acid (obtainable by reacting 1-chlor-2-benzoylanthraquinone-4'-carboxylic acid which is obtainable by complete chlorination of the methyl group of 1-chlor-2-para-toluylanthraquinone in trichlorbenzene while irradiating, saponification of the chloro compound with 96 per cent sulphuric acid, or by oxidizing 1-chlor-para-toluylanthraquinone with pyrolusite in the presence of sulphuric acid with hydrazine hydrate in the presence of pyridine and conversion of the PyC-phenyl-1(N).2-pyrazoloanthraquinone-4'-carboxylic acid thus obtained into the chloride by treatment with thionyl chloride in nitrobenzene) having the constitution:

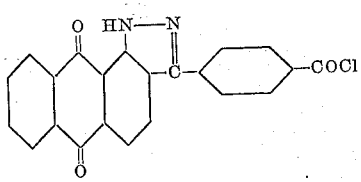

22.3 parts of 1-aminoanthraquinone and 442 parts of nitrobenzene is heated to boiling while stirring until hydrogen chloride no longer escapes. After cooling, the yellow crystalline precipitate is filtered off by suction, washed and dried. A dyestuff which dyes cotton very fast yellow shades from a brown vat is thus obtained in almost the quantitative yield. The dyestuff has the following formula:—

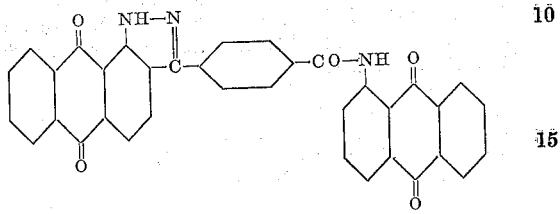

If 34.2 parts of 1-amino-5-benzoylaminoanthraquinone be used instead of 1-aminoanthraquinone, a yellow vat dyestuff of excellent fastness is also obtained while 1-amino-4-benzoylaminoanthraquinone yields a vat dyestuff giving yellow-red dyeings having otherwise similar proportion.

Example 8

19 parts of the chloride of PyC-phenyl-1(N).2-pyrazoloanthraquinone-4'-carboxylic acid used in Example 7 and 6.5 parts of 1.5-diaminoanthraquinone are introduced into 360 parts of nitrobenzene heated to 150° C. and the mixture is then heated for 2 hours at from 150° to 155° C. The compound obtained, in which both amine groups are acylated, is filtered off by suction after cooling, washed with benzene and methanol and dried. It dyes cotton powerful reddish yellow shades from a red-brown vat and has the following formula:—

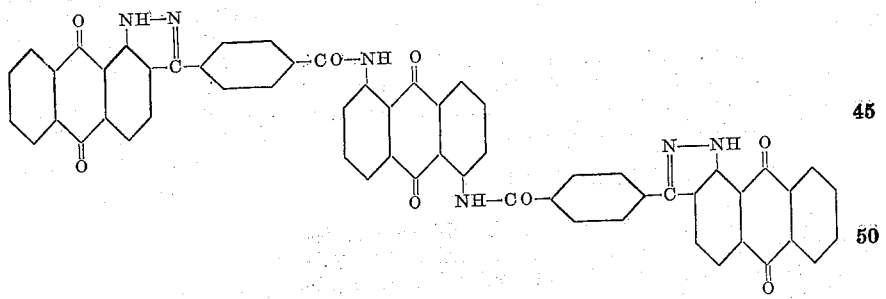

Example 9

A mixture of 19 parts of the acid chloride used in Example 7 and 13 parts of 5-amino-1,9-anthrapyrimidine is treated in the manner described in Example 8. The vat dyestuff obtained after working up dyes cotton beautiful golden-orange shades from a red-brown vat and has the following formula:—

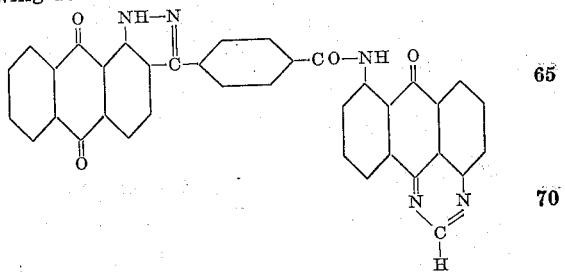

When using 4-amino-1,9-anthrapyrimidine, a greenish yellow vat dyestuff is obtained.

Example 10

19 parts of the acid chloride used in Example 7 are added to a solution, heated to 150° C., of 12 parts of 1,5-diaminoanthraquinone in 500 parts of nitrobenzene, the mixture then being heated for 5 hours at from 150° to 155° C. The compound obtained in which one free amino group is still present, is filtered off by suction at 100° C., washed and dried. It dyes cotton yellow-orange shades from a red-brown vat and has the following formula:—

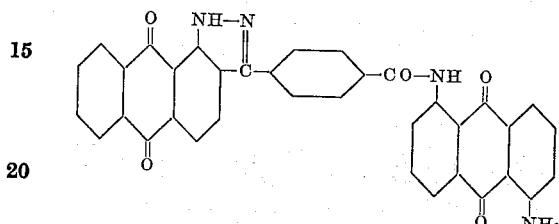

Example 11

A mixture of 5 parts of the dyestuff obtainable according to Example 10, 5 parts of benzoyl chloride and 50 parts of nitrobenzene is heated for three hours at from 170° to 180° C. and the resulting compound is filtered off by suction at 100° C., washed and dried. It dyes cotton fast yellow shades from a brown vat and has the following formula:—

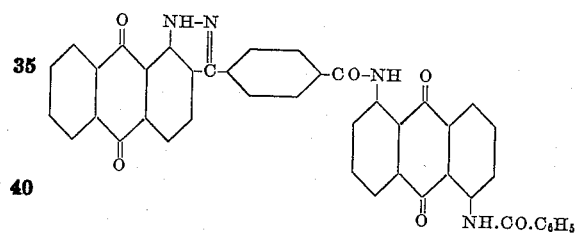

Dyestuffs having similar properties are obtained by using para-chlorbenzoyl chloride, para-toluylic acid chloride or 2.5-dichlorbenzoyl chloride instead of benzoyl chloride.

Example 12

A mixture of 40.1 parts of the chloride of N-methyl - PyC - phenyl-1(N).2-parazoloanthraquinone-4'-carboxylic acid (obtainable by the treatment of the PyC-phenyl-1(N).2-pyrazoloanthraquinone-4'-carboxylic acid prepared according to Example 7 with para-toluene sulphonic acid methyl ester, saponification with sulphuric acid and reaction with thionyl chloride in the presence of nitrobenzene), 22.3 parts of 1-aminoanthraquinone and 400 parts of nitrobenzene is heated to boiling until hydrogen chloride no longer escapes. After cooling, the yellow crystal powder is filtered off by suction, washed and dried. A dyestuff is thus obtained which dyes cotton very fast yellow shades from a brown vat and has the following formula:—

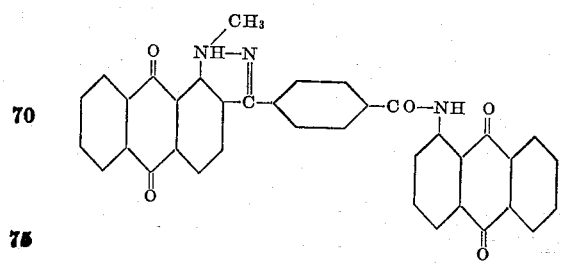

With 34.2 parts of 1-amino-5-benzoylanthraquinone, a vat dyestuff having similar properties is obtained, with 1-amino-4-benzoylaminoanthraquinone a dyestuff yielding fast orange dyeings from a brown vat is obtained and with 4-amino-1.9-anthrapyrimidine a dyestuff is obtained which dyes cotton yellow shades from a brown vat.

Example 13

A mixture of 40.1 parts of the chloride of N-methyl - PyC-phenyl-1(N).2 - pyrazoloanthraquinone-4'-carboxylic acid, 27.7 parts of the sodium compound of 1-mercapto-2-aminoanthraquinone and 530 parts of 1.2-dichlorbenzene is heated slowly to boiling while stirring. A golden yellow compound is thus obtained which after cooling is filtered off by suction, washed and dried. It dyes cotton fast golden yellow shades from a brown vat and has the following formula:—

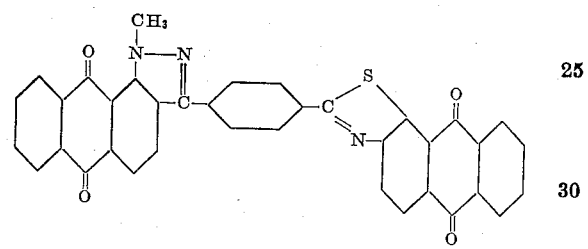

Example 14

A mixture of 5 parts of the compound derived from PyC - phenyl - 1(N).2 - pyrazoloanthraquinone-4'-carboxylic acid and 1-amino-5-benzoyl-aminoanthraquinone according to Example 7, 5 parts of para-toluene sulphonic acid methyl ester, 150 parts of trichlorbenzene and 5 parts of sodium carbonate is heated to boiling for 3 hours while stirring. The mixture is worked up in the usual manner and a dyestuff is thus obtained which dyes cotton fast yellow shades from a red-brown vat and has the following formula:—

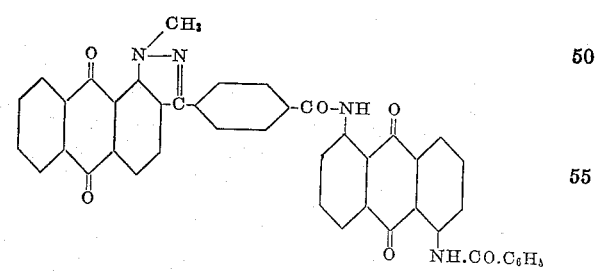

A dyestuff having similar properties is formed by using for the alkylation in a closed vessel methyl chloride in the presence of dilute caustic soda solution at from 50° to 60° C.

Example 15

A mixture of 4.2 parts of the chloride of 4-chlor-1(N).2-pyrazoloanthraquinone-PyC-phenyl-4'-carboxylic acid (obtainable for example by diazotizing 4-chlor-1-amino-2-(para-carboxybenzoyl)-anthraquinone in concentrated sulphuric acid, treatment of the diazonium salt with aqueous sodium bisulphite solution while heating and reaction of the pyrazole carboxylic acid with thionyl chloride in the presence of nitrobenzene), 3.6 parts of 1-amino-5-benzoylaminoanthraquinone and 100 parts of nitrobenzene is heated for 4 hours at 140° C. The dyestuff is filtered off by suction at the same temperature. It dyes cotton reddish yellow shades from a red-brown vat and has the following formula:—

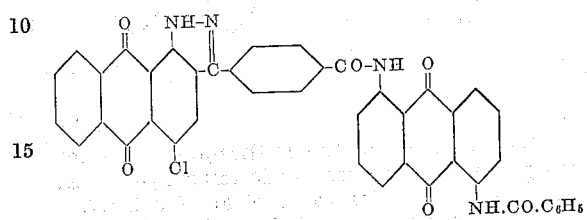

Example 16

A mixture of 17 parts of the chloride of 1(N).2-pyrazoloanthraquinone-PyC-chlorphenyl-4'-carboxylic acid (obtainable for example by the oxidation of the ketone (obtainable from 1-chlor-anthraquinone-2-carboxylic acid chloride and parachlortoluene in the presence of anhydrous aluminum chloride) with chromic acid in glacial acetic acid, reaction of the resulting acid with hydrazine hydrate in pyridine and treatment of the pyrazole carboxylic acid with thionyl chloride in the presence of nitrobenzene), 14 parts of 1-amino-5-benzoylaminoanthraquinone and 1200 parts of nitrobenzene is heated for 3 hours at 160° and the dyestuff formed is filtered off by suction at the same temperature. It dyes cotton powerful yellow shades from a red-brown vat and has the following formula:—

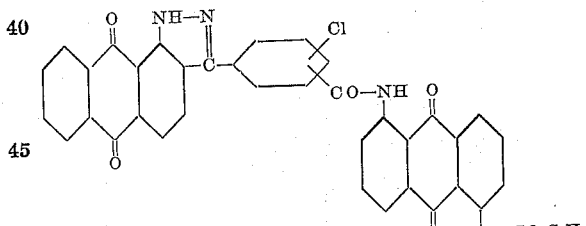

Example 17

A mixture of 2.3 parts of the chloride of 1(N).2-pyrazoloanthraquinone-PyC-phenyl-2'.4'-dicarboxylic acid (obtainable by the oxidation of 1-chlor-2-(2'.4'-dimethylbenzoyl)-anthraquinone with chromic acid in sulphuric acid solution, reaction of the dicarboxylic acid thus formed with hydrazine hydrate in pyridine and treatment of the pyrazole dicarboxylic acid thus obtained with thionyl chloride in the presence of nitrobenzene), 3.6 parts of 1-amino-5-benzoylaminoanthraquinone and 100 parts of nitrobenzene is heated for 4 hours at 160° C. The dyestuff is filtered off by suction at 120° C. It dyes cotton powerful yellow shades from a red-brown vat and has the following formula:

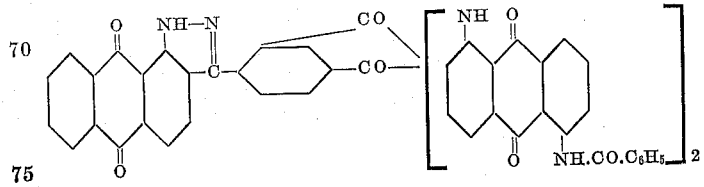

A similar dyestuff is obtained when, instead of the said acid, its methyl compound prepared by treatment with dimethyl sulphate in aqueous alkaline solution is employed.

Example 18

A mixture of 23 parts of the chloride of the N-phenyl-1(N).2 - pyrazoloanthraquinone - PyC-phenyl-4'-carboxylic acid (obtainable by reacting the methylester of the 1-chlor-2-benzoylanthraquinone-4'-carboxylic acid (cf. Example 7) with phenylhydrazine in the presence of trichlorbenzene and potassium acetate, saponification of the resulting ester with an alcoholic solution of caustic soda and treatment of the carboxylic acid formed with thionylchloride in the presence of nitrobenzene), 28 parts of 1-amino-5-benzoylaminoanthraquinone and 750 parts of nitrobenzene is heated for 3 hours at about 145° C., and half an hour at 160° C., and the resulting dyestuff is filtered off by suction at 120° C., washed and dried. It dyes cotton powerful yellow shades from a red-brown vat and has the following formula:—

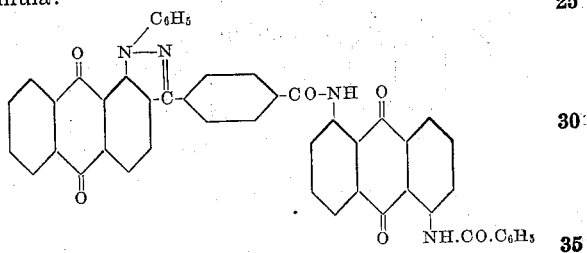

What we claim is:
1. Vat dyestuffs of the anthraquinone series corresponding to the general formula

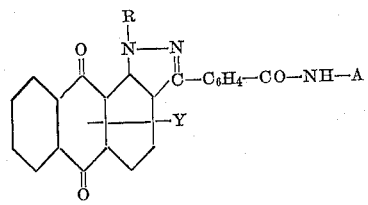

wherein R stands for a member selected from the class consisting of hydrogen and the alkyl and aryl hydrocarbon radicals, Y for an element of the class consisting of hydrogen and halogen, and A for the radical of an aromatic para-quinoid compound containing at least one cyclic bound keto group selected from the class consisting of anthraquinone and anthrapyrimidine radicals.

2. Vat dyestuffs of the anthraquinone series corresponding to the general formula

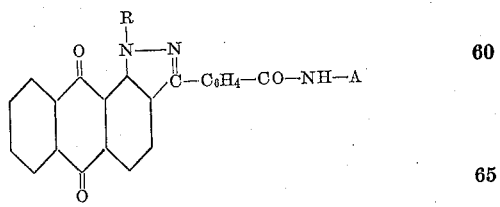

wherein R stands for a member selected from the class consisting of hydrogen and the alkyl and aryl hydrocarbon radicals and A for a radical of an anthraquinone.

3. The vat dyestuff of the anthraquinone series of the formula

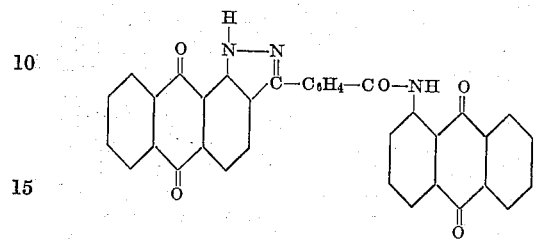

4. The vat dyestuff of the anthraquinone series of the formula

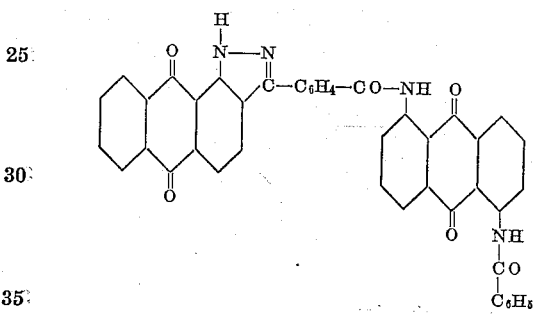

5. The vat dyestuff of the anthraquinone series of the formula

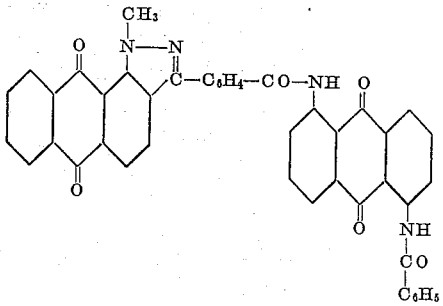

6. Vat dyestuffs of the anthraquinone series corresponding to the general formula Py—X—A, wherein Py stands for the radical of a 1(N).2-pyrazoloanthraquinone and A for the radical of an aromatic paraquinoid compound selected from the class consisting of anthraquinone and anthrapyrimidine radicals, and wherein X represents a bridge by which A is combined with the PyC-atom of Py by a member selected from the class consisting of —CO—NH, —aryl—CO—NH, $-\underset{\underset{\text{O}\text{—}\text{a}}{|}}{C}=N-a$, $-\underset{\underset{\text{S}\text{—}\text{a}}{|}}{C}=N-a$, $-\underset{\underset{\text{HN}\text{—}\text{a}}{|}}{C}=N-a$, —aryl—$\underset{\underset{\text{O}\text{—}\text{a}}{|}}{C}=N-a$, —aryl—$\underset{\underset{\text{S}\text{—}\text{a}}{|}}{C}=N-a$, and —aryl—$\underset{\underset{\text{HN}\text{—}\text{a}}{|}}{C}=N-a$, the linkages marked $a$ being connected with two ortho positions of A.

GEORG RÖSCH.
PAUL NAWIASKY.
KARL SAFTIEN.